United States Patent
Hecht et al.

[19]

[11] Patent Number: 6,012,755

[45] Date of Patent: Jan. 11, 2000

[54] FOLDABLE AUTOMOTIVE SEAT

[75] Inventors: Robert L. Hecht, Trollhattan, Sweden; Marcel Corneliu Ban, Troy; Alan Sturt, West Bloomfield, both of Mich.

[73] Assignee: Lear Corporation, Southfield, Mich.

[21] Appl. No.: 08/950,573

[22] Filed: Oct. 15, 1997

[51] Int. Cl.$^7$ ....................................................... B60N 2/02
[52] U.S. Cl. ................................... 296/65.03; 296/65.09; 248/503.1
[58] Field of Search .................................. 296/64, 65.01, 296/65.03, 63, 65.09, 65.11; 297/15; 248/503.1

[56] References Cited

U.S. PATENT DOCUMENTS

| | | |
|---|---|---|
| 3,151,906 | 10/1964 | Roberts . |
| 3,746,389 | 7/1973 | Fourrey . |
| 4,322,052 | 3/1982 | Hodge et al. ..................... 296/65.09 X |
| 4,341,415 | 7/1982 | Braun et al. . |
| 4,805,952 | 2/1989 | Coleman .............................. 296/65.03 |
| 5,116,097 | 5/1992 | Bulgari . |
| 5,443,239 | 8/1995 | Laporte ............................ 296/65.03 X |
| 5,482,346 | 1/1996 | Lesourd . |
| 5,492,386 | 2/1996 | Callum . |
| 5,527,087 | 6/1996 | Takeda et al. . |
| 5,611,589 | 3/1997 | Fujii et al. . |
| 5,636,884 | 6/1997 | Ladetto et al. ................... 296/65.11 X |

FOREIGN PATENT DOCUMENTS

| | | | |
|---|---|---|---|
| 2359369 | 11/1972 | Germany ................................. 296/63 |

*Primary Examiner*—D. Glenn Dayoan
*Assistant Examiner*—Jason Morrow
*Attorney, Agent, or Firm*—Brooks & Kushman P.C.

[57] ABSTRACT

An automotive seat assembly for accommodating rear passengers in a passenger compartment. The seat assembly includes a base that may be secured to the vehicle floor structure and an articulated seat frame that supports a lower seat portion, a back portion of the seat assembly being foldable forward. The articulated frame includes forward and rearward legs, one leg being biased by a spring toward a normal passenger supporting position and the other leg being biased by a spring towards a folded position of the seat assembly. The spring force acting on one leg acts on a variable moment arm so that the force moment created by the spring force on the other leg is opposed, the seat assembly assuming a folded position as an over center position of the forward arm is reached, the variable moment arm of the spring force acting on the one arm maintaining the legs in a normal upright position when the seat assembly is in use.

5 Claims, 6 Drawing Sheets

FOLDABLE AUTOMOTIVE SEAT

TECHNICAL FIELD

The invention relates to auxiliary automotive seats that may be removed and folded for storage.

BACKGROUND OF THE INVENTION

Sport utility vehicles and automotive minivans currently sold in the automotive vehicle market typically include auxiliary or third-row seat assemblies for accommodating rear seat passengers in the passenger compartment. These seats can be folded and removed from the floor structure of the vehicle passenger compartment to provide cargo carrying space. It is current practice to fold the seat-back portion of the seat assembly forward over the lower seat portion to permit loading of cargo into the passenger compartment through a rear hatch opening. Alternatively, the seat assembly may be removed from the vehicle by removing anchor bolts or retainer pins for the seat support structure so the seat assembly can be stored externally of the vehicle.

In converting the passenger compartment of such vehicles for cargo carrying use, the rear seat assembly, when the seat back portion is folded forward, reduces the cargo carrying capacity because of the space the seat assembly occupies in the folded state. Furthermore, if the seat assembly is removed entirely from the vehicle to permit increased cargo carrying capacity, the disassembly procedure is awkward and time-consuming. This also involves the inconvenience of storing the seat assembly until it can be reassembled into the passenger compartment.

In some instances, rear seat assemblies for sport utility vehicles and minivans make provision for tilting the rear passenger seat forward after the seat back portion is folded forward over the seat portion. When the seat assembly is tumbled in this fashion toward the front seat assembly, it likewise requires considerable space within the passenger compartment thereby further limiting the cargo carrying capacity of the vehicle.

SUMMARY OF THE INVENTION

It is an objective of the invention to overcome the disadvantages of prior art rear passenger seat constructions for sport utility vehicles and minivans by providing a seat assembly that has foldable legs and seat support structure for the lower seat portion of the seat assembly, thereby permitting the lower seat portion to be adjusted to a position near the plane of the floor pan structure of the vehicle. As the upright seat back portion of the seat assembly is folded forward, the space occupied by the folded seat assembly is substantially less than that which would be required for conventional rear seat assemblies for sport utility vehicles and minivans.

In accordance with another objective of the invention, provision is made for unlatching the seat assembly thereby permitting removal of the seat assembly from the floor pan structure through a rear hatch opening for the vehicle.

The seat frame and riser structure that supports the lower seat portion of the seat assembly comprises forward and rearward legs that are adapted to be secured to a mounting base that in turn is secured to the floor pan structure of the vehicle. A simple latching mechanism secures the legs to the mounting base. The legs are connected together by means of an articulated linkage mechanism so that they move together from a normal upright position to a folded position.

A first torsion spring normally urges the forward and rearward legs to their upright positions. A second torsion spring normally urges the forward legs to a folded position. Each forward leg is connected to a pivot for a rear leg by a movable linkage system having a variable moment arm. The torque of the torsion spring that acts on the forward leg is overcome by the torque of the torsion spring acting on the rear leg when the legs are extended manually to their normal upright positions. When the legs are folded manually to their lowered or folded position, the moment arm length changes so that the forward and rearward legs are held in their folded position as the articulated linkage connecting the legs together pass beyond an overcenter position.

The invention includes a seat base secured to the vehicle floor. The assembly has a seat frame for a lower seat portion and a riser assembly having cross bars that may be secured in retainer channels in the base.

The riser assembly includes forward and rearward legs that are pivotally connected to the frame. A foldable parallelogram linkage connects the legs together and supports the frame on the base. The linkage includes an adjustable link between the lower end of one leg and the other leg including a movable connecting element, such as a roller assembly, between the other leg and the adjustable link. The roller assembly varies the distance between the upper end of the other leg and the adjustable link.

Provision may be made in the passenger compartment for storing the folded seat assembly in a storage bin located below the surface of the floor pan structure itself. In the alternative, the folded seat assembly can be stored externally of the vehicle at a convenient location until it is reassembled in the vehicle on its floor mounted base.

PARTICULAR DESCRIPTION OF THE INVENTION

Figure 1:
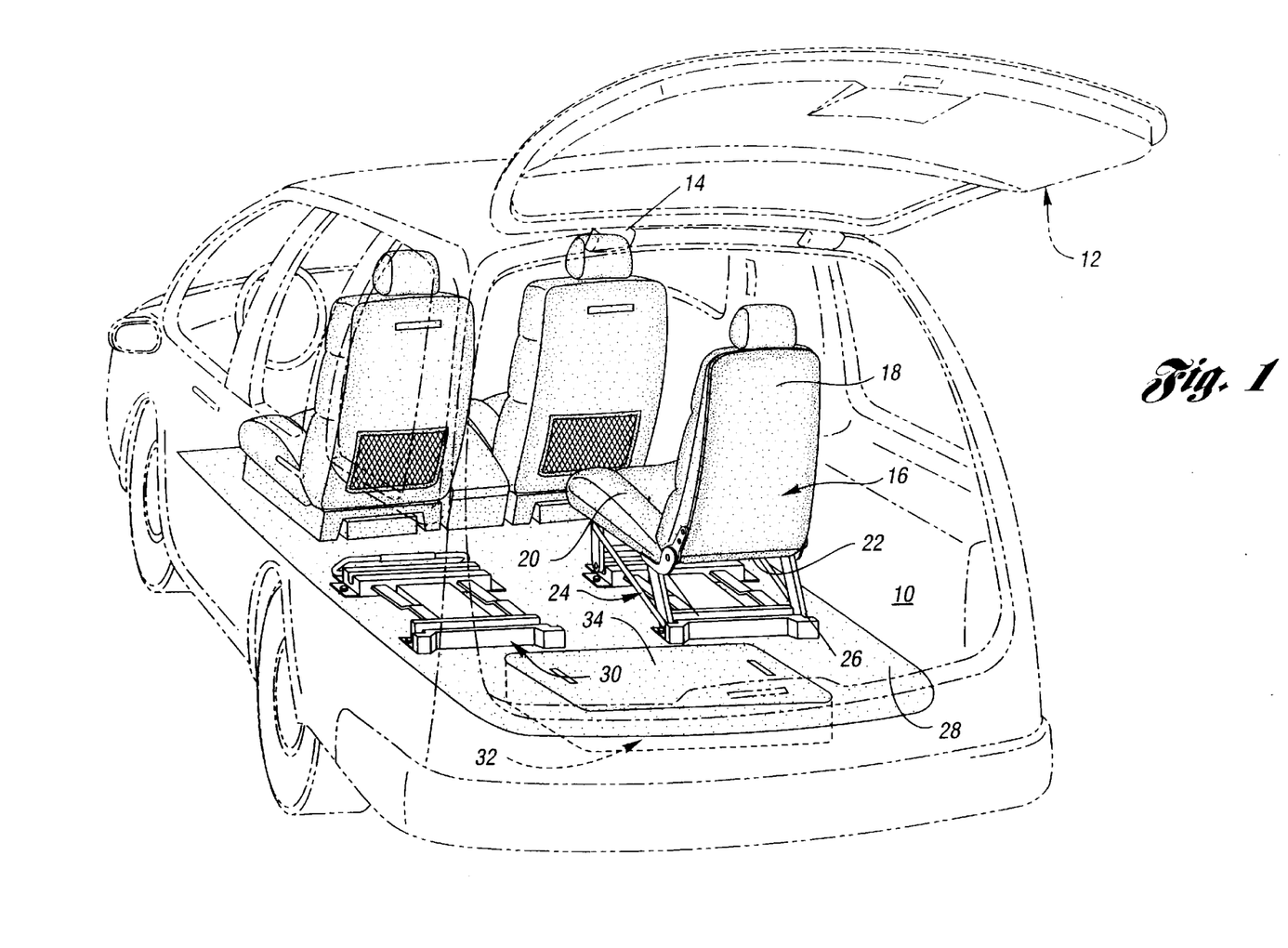
FIG. 1 shows a minivan with a rear hatch opening that exposes a rear seat assembly embodying the features of the invention.

FIG. 1 shows a contemporary minivan having a rear access hatch opening and a rear hatch closure 12 the latter being hinged on the upper margin of the opening 10, as seen at 14. The rear seat of the invention is generally designated by reference numeral 16.

The rear seat 16 has an upright backrest or seat back portion 18 and a passenger supporting seat portion 20. A seat frame 22 supports the seat portion 18. The upright seat back portion 18 is pivoted at the rear margin of the seat support frame 22 so that it may be folded forward over the seat portion 20 when the seat is not in use.

The foldable riser assembly is designated generally by reference numeral 24. The riser assembly supports the frame 22 in its normal operative position. A seat assembly base 26 is secured to the structural floor of the minivan by anchor bolts or other suitable anchoring devices, the floor being indicated by reference numeral 28. The riser assembly is secured to the base 26 in a manner that will be described subsequently.

FIG. 1 shows a second base 30 for supporting a second seat assembly if a double seat arrangement is desired.

The riser assembly 24 can be removed in a manner that will be described subsequently, thereby permitting removal of the seat 16 from the vehicle so that it can be used externally of the vehicle—for example, in a recreational setting such as a picnic.

Figure 1A:
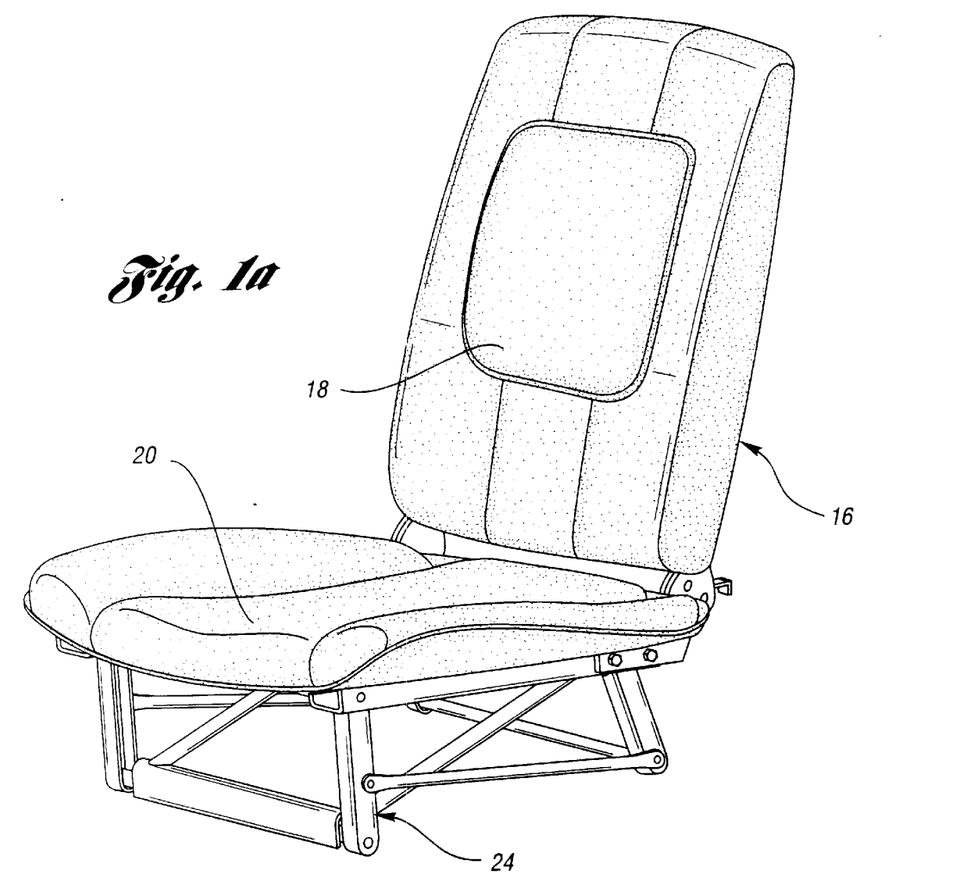
FIG. 1a shows the seat assembly of FIG. 1 when it is removed from the vehicle and seated on the ground in its normal upright position.
Figure 1B:
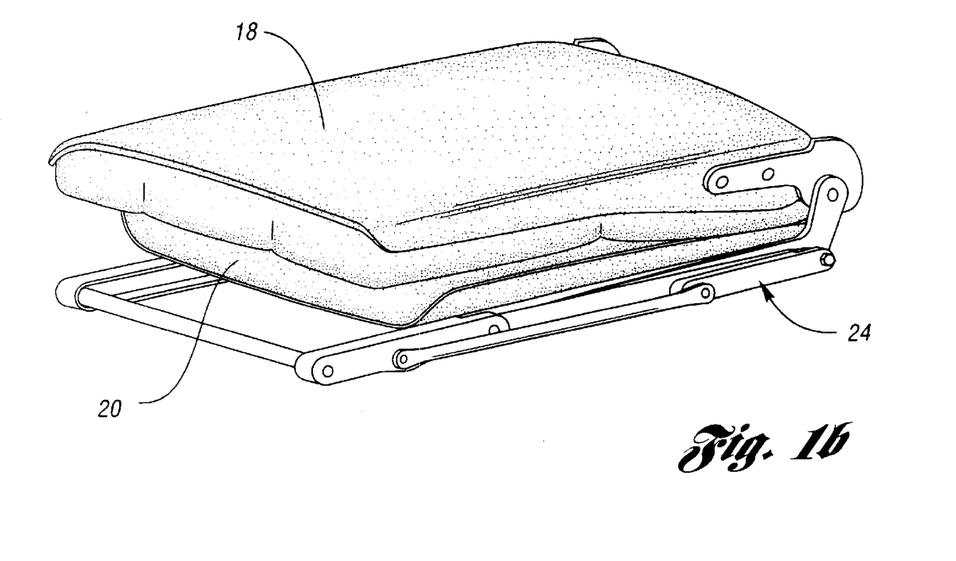
FIG. 1b shows the seat assembly of FIG. 1 in its folded position resting on the ground after removal from the passenger compartment.
Figure 2:
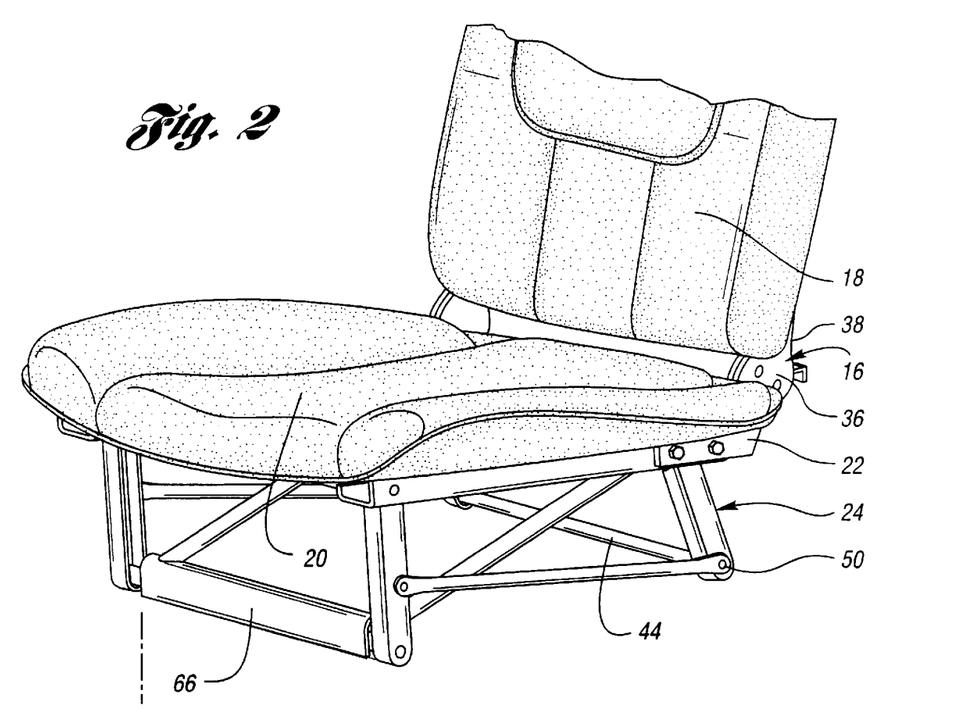
FIG. 2 is a perspective assembly view of the seat assembly of FIG. 1.

FIG. 1a shows the seat 16 mounted externally of the vehicle. FIG. 1b shows the seat assembly 16 in a folded condition. The seat back portion 18, seen in FIG. 1a, is folded over the passenger supporting lower seat portion 20, as seen in FIG. 1b. The riser assembly 24, as seen in FIG. 1b, is in its lowered position, thereby providing a minimal overall height of the folded seat assembly as the seat portions are stacked, one on top of the other.

When the seat is folded, as shown in FIG. 1b, it conveniently may be stored in a storage bin shown in phantom at 32 in FIG. 1. The storage bin may have an upper closure panel 34 in the floor structure 28 of the vehicle, as shown in FIG. 1.

The seat frame 22 is hinged at 36 to the lower portion of a seat back frame 38 which supports the upright seat back portion 18. The seat back portion 18 thus can be pivoted forward to the position shown in FIG. 1b as it pivots about the hinge 36.

Figures 4, 4A, 5:
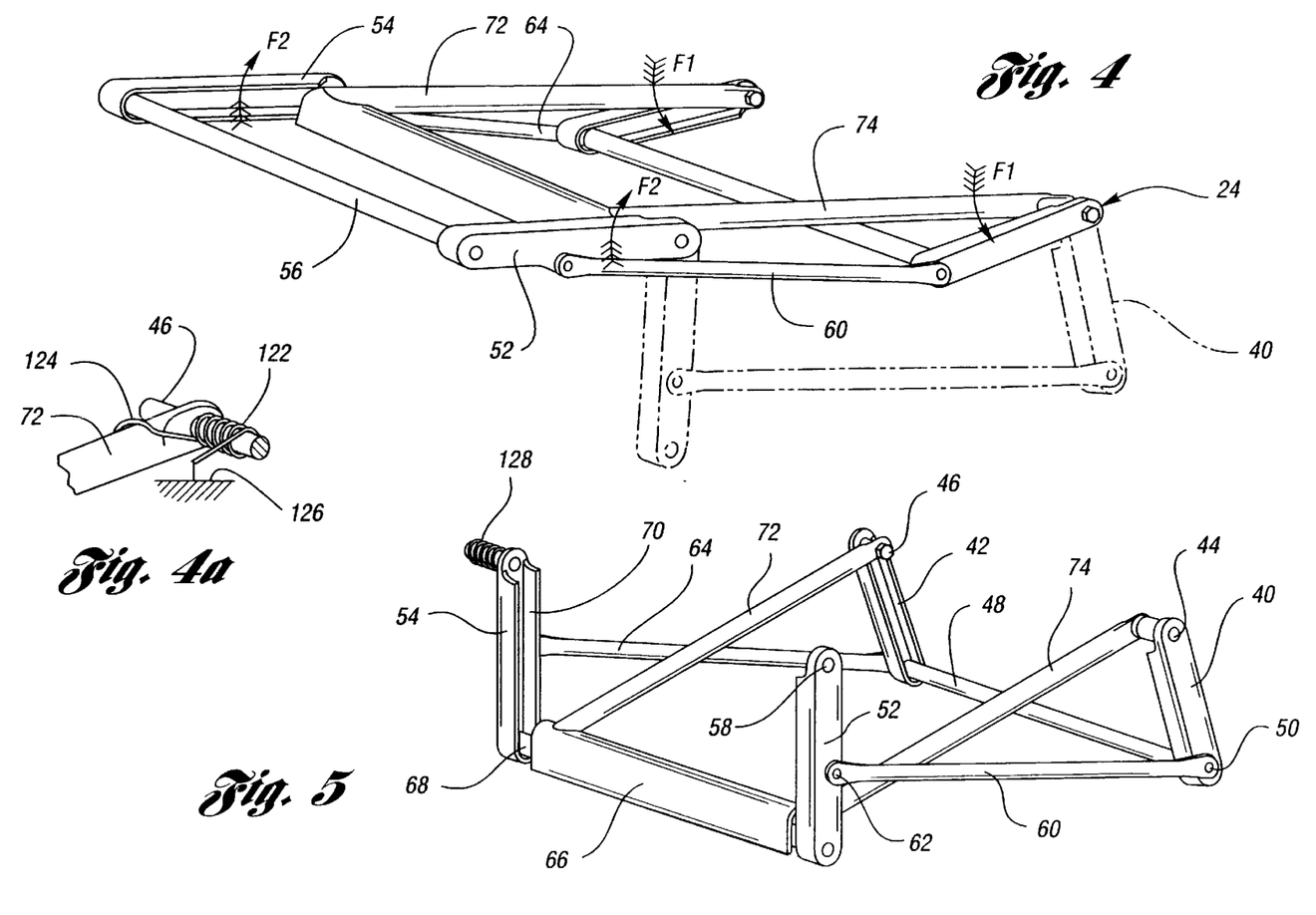
FIG. 4 shows the articulated linkage for the seat assembly of FIGS. 1 and 2 when it is moved to its folded state.
FIG. 4a is a detailed subassembly view showing a torsion spring for biasing the rear leg of the seat assembly of FIGS. 1 and 2.
FIG. 5 shows a portion of the articulated linkage of the seat assembly of FIGS. 1 and 2 when it is in its normal upright state.

For purposes of describing the riser assembly 24, reference will be made to FIGS. 4, 5, 6 and 7. FIG. 4 shows the riser assembly in its folded state. FIG. 5 shows the riser assembly in its normal upright state. The riser assembly comprises a pair of rear legs 40 and 42, each of which is hinged on the frame 22, not shown in FIGS. 4, 5, 6 and 7, by means of a hinge bolt or pin 44 or 46, respectively. The lower ends of the legs 40 and 42 are connected together by a rear cross bar 48. The ends of the cross bar are joined or hinged to the lower ends of the legs 40 and 42 as indicated by reference numeral 50.

The riser assembly 24 includes also a pair of front seat-supporting legs 52 and 54. A first cross bar at the front of the riser assembly connects the lower ends of the legs 52 and 54, as shown at 56. The ends of the cross bar 56 are pivotally joined to each of the lower portions of the legs 52 and 54. The upper portion of each of the legs 52 and 54 is pivotally joined to the frame 22 by means of a pivot pin or pivot bolt. The pin or bolt opening for the pivotal connection of leg 52 is designated in FIG. 5 by reference numeral 58.

The lower end of the leg 40 is joined to an intermediate location of the leg 52 by linkage member 60. Linkage member 60 extends from the hinged connection at 50 to a pivot point 62 on the leg 52 intermediate the upper and lower ends of the leg. A corresponding linkage member 64 joins the hinged connection at the lower end of the leg 42 to an intermediate location of the forward leg 54.

A forward cross bar 66 is situated between the lower end of leg 52 and the lower end of leg 54. Each end of the cross bar 66 carries a roller assembly, one of which is generally indicated in FIG. 5 at 68. The roller assembly 68 is mounted within a three-sided channel 70 formed in the leg 54. The roller assembly 68 can move within the channel 70 from one end of the leg to the other. The roller assembly will be described with reference to FIGS. 5a, 5b and 5c. A corresponding roller assembly is provided for leg 52.

The upper end of the leg 42 is connected by linkage member 72 to one end of the forward cross bar 66. A corresponding linkage member 74 connects the opposite end of the cross bar 66 to the upper end of the leg 40. The linkage members 72 and 74 are pinned to their respective legs 42 and 40 by hinge pins or hinge bolts 46 and 44.

When the riser assembly is adjusted from the lowered position shown in FIG. 4 to the upright position shown in FIG. 5 and shown in phantom in FIG. 4, the cross bar 66 envelopes or surrounds the cross bar 56.

Figures 5A, 5B, 5C:
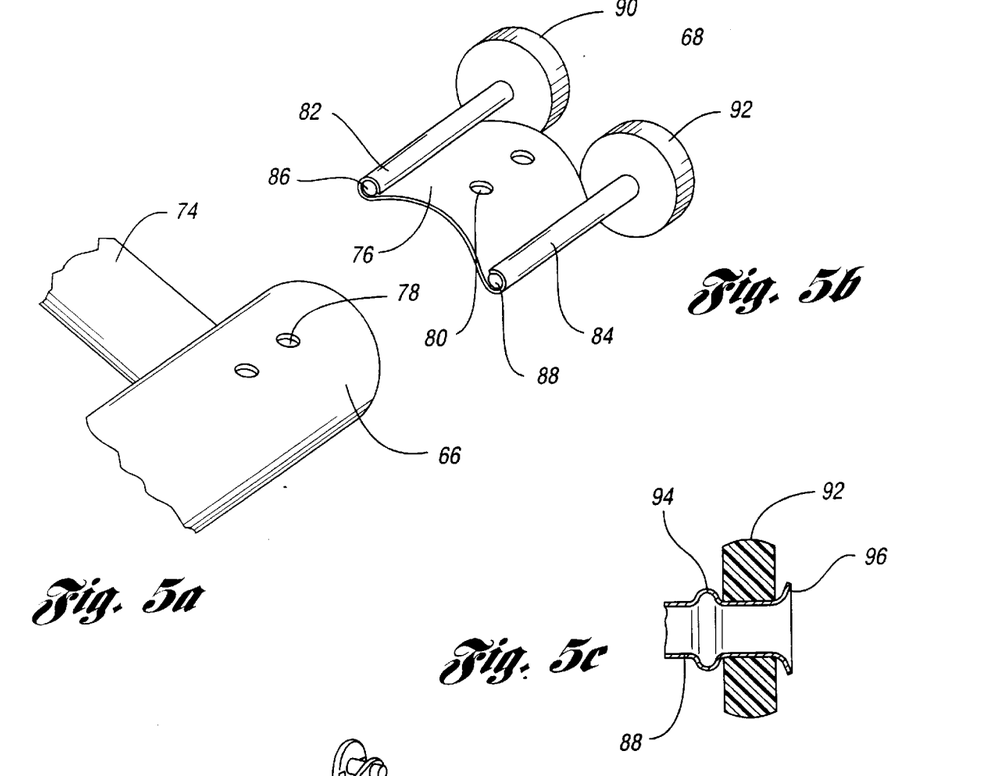
FIG. 5a is a detailed view of a forward portion of the linkage assembly of FIGS. 4 and 5.
FIG. 5b is a detailed view of a roller assembly that is used to connect the linkage assembly for the seat assembly of FIGS. 1 and 2 with the adjustable forward legs.
FIG. 5c is a detailed view of the rollers seen in FIG. 5b.

FIGS. 5a, 5b and 5c show one of several possible design approaches for the design of the roller assembly 68. The roller assembly may include an arcuate plate 76 which may be bolted, riveted, welded, or otherwise secured to the upper face of the cross bar 66. In the embodiment shown in FIGS. 5a and 5b, rivet or other fastener holes 78 and 80 may be formed in the cross bar 66 and the member 76 as indicated.

The opposed ends of the plate 76 can be curled, as shown at 82 and 84, so that roller shafts 86 and 88 can be retained. One end of shaft 82 carries a nylon roller 90 and the corresponding end of the shaft 88 carries a nylon roller 92. FIG. 5c shows a nylon roller retainer, which comprises a rib 94 at the end of the shaft 88 and a flared end or flange 96. The flange 96 and the rib 94 secure the nylon roller 92 against axial displacement while permitting rotation about the axis of the shaft 88.

The rollers 90 and 92 are situated in the channel 70 and engage the sides of the channel as the cross bar 66 as it is guided from one end of the channel to the other. A corresponding roller assembly, not shown, is provided for establishing an adjustable connection between the opposite end of the cross bar 66 and the forward leg 52.

Figure 3:
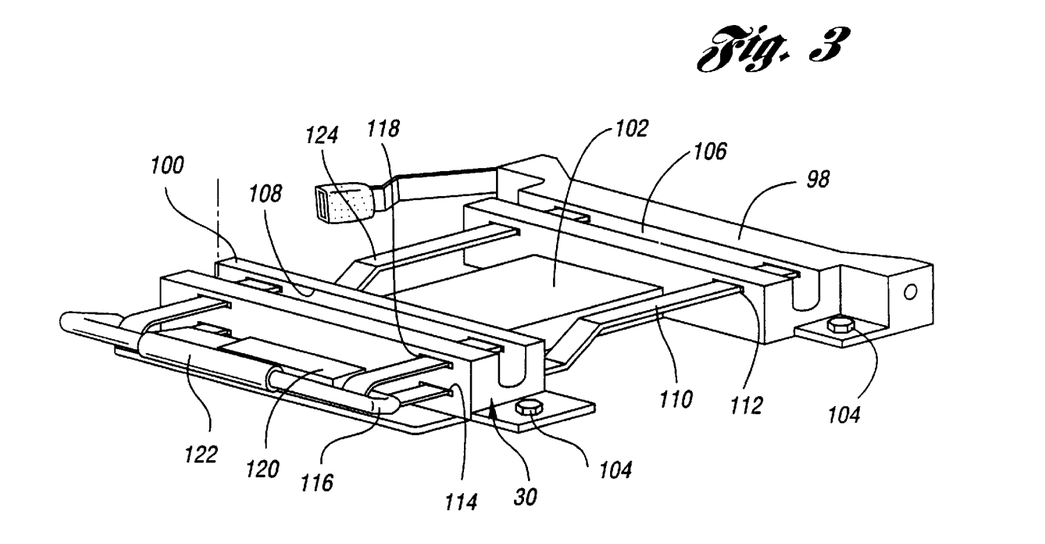
FIG. 3 shows a floor mounted base for supporting the seat assembly of FIG. 2.
Figure 6:
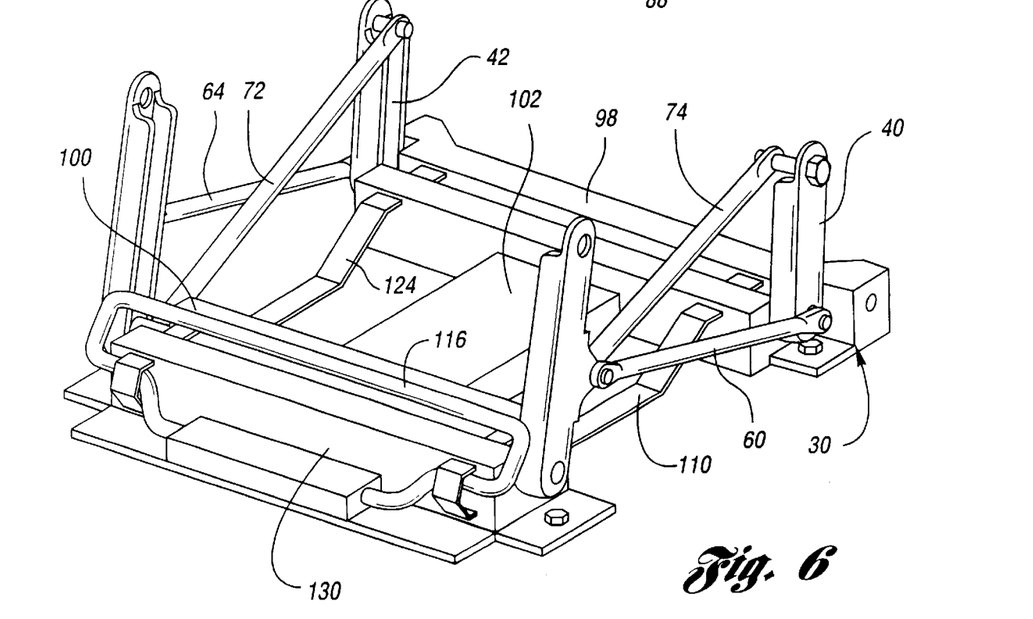
FIG. 6 is a perspective view of the linkage mechanism of FIG. 5 together with the floor mounted base for the seat assembly.

FIGS. 3 and 6 show the details of the floor mounted base 30. Base 30 includes a rear portion 98 and a forward portion 100. These are connected by a connector plate 102, thereby forming an integral assembly. The base assembly can be secured by anchor bolts 104 to the floor structure of the vehicle.

Base portion 98 includes a cross channel 106 extending in a transverse direction. A corresponding cross channel 108 is formed in the base portion 100. The cross bar 48, when the seat assembly is mounted on the base, is received in the cross channel 106. Similarly, the front cross bar 66 of the riser assembly is received in the cross channel 108. When the riser assembly is in its upright position, the cross bar 66, as well as the bar 56, are both nested in the cross channel 108.

A steel bar 110 extends through slots or openings 112 formed in the base portion 98. Similarly, the opposite end of the steel bar 110 extends through slots or openings 114 formed in the base portion 100. In a preferred embodiment of the invention, one end of the steel bar 110 surrounds a driver-operated lever 116 and is bent around the lever through an angle of 180° so that the end of the bar 110 is received in slots or openings 118 in the base portion 100.

The lever 116 has one end thereof pivoted on a pivot block 120 carried by the forward base portion 100. When the lever 116 is moved in a counterclockwise direction from the position shown in FIG. 3, the bar 110 moves to the left. This permits the cross bar 66 and the cross bar 48 to be moved upwardly, thereby disconnecting the riser assembly from the base. When the lever is moved in a clockwise direction from the position shown in FIG. 3, the steel bar 110 moves through the slots 114 and 118 in the forward base portion 100 and through the slots or openings 112 formed in the rear base portion 98. This locks the cross bars 66 and 48 within their respective channels 108 and 106.

The lever 116 may be designed with a hand grip 122 to permit the passenger to manually move the lever clockwise or counterclockwise, depending upon whether the seat is to be removed or locked in place. A spring, not shown, may be provided to normally urge the lever to its locking or latching position.

The riser assembly includes also a steel bar 124 corresponding to the steel bar 110, thereby securing the opposite ends of the cross bars 48 and 66 within the channels 106 and 108, respectively.

Figure 7:
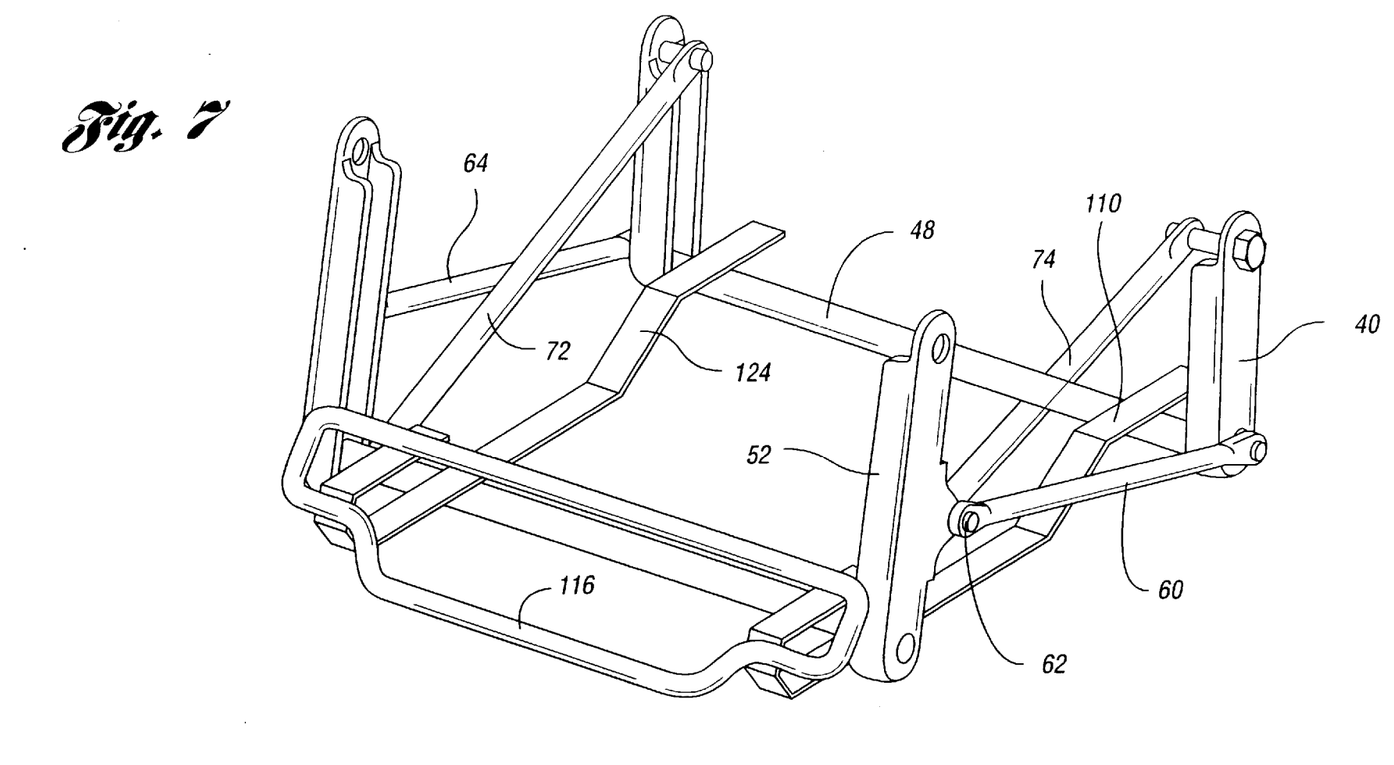
FIG. 7 is a view similar to FIG. 6 with the floor mounted base structure removed for purposes of clarity.

FIG. 7 is provided to add clarity to the embodiment of the invention shown in FIGS. 3 and 6, although the base is omitted for purposes of clarity and to assist in identifying the linkage elements.

The linkage member 74 normally is urged in a counterclockwise direction about the axis of pivot pin or pivot bolt 24 when the riser is viewed in the position shown in FIG. 4.

FIG. 4a shows a torsion spring assembly that may be used for imparting a force moment or torque on the linkage member 72. It is contemplated that a force moment can be applied to these linkage members in a variety of ways, but FIG. 4a shows one preferred embodiment for doing so. This embodiment includes a torsion spring 122 which may encircle the pivot pin or pivot bolt 46. One end 124 of the torsion spring engages the linkage member 72 and the opposite end 126 engages the relatively stationary seat frame 22. For clarity, the seat frame is not shown in FIGS. 4, 5, 6 and 7.

The torsion spring 122 tends normally to urge the linkage member 72 with a torque in the direction of the arrow F1 in FIG. 4. Thus, the spring 122 tends normally to adjust the riser to its upright position shown in FIG. 5. A torsion spring assembly corresponding to the torsion spring assembly at FIG. 4a is disposed between the seat frame and the linkage member 74 and, like the linkage member 72, the linkage member 74 normally is urged in a direction that tends to move the riser to its upright position.

A torsion spring assembly is situated also between the leg 54 and one end of the cross bar 56. Although it is not fully shown in detail, it is represented schematically by reference numeral 128 in FIG. 4. The torsion spring 128 tends normally to move the leg 54 to its folded position with a torque in the direction of arrow F2. When the riser assembly is moved to its upright position, the leg 54 moves from the position shown in FIG. 4 to the position shown in FIG. 5 against the opposing force of the torsion spring 128.

The leg 52, like the leg 54, also includes a torsion spring, not shown, which tends to resist movement of the leg 52 from its folded position shown in FIG. 4 to its upright position shown in FIG. 5.

When the front forward cross bar 66 is moved from the folded position to the upright position shown in FIG. 5, the operator will apply to it a downward force in order to overcome the opposing force of the spring 128 for the leg 54 and the corresponding spring for the leg 52. The force applied by the operator to the cross bar 66 is assisted by the torsion spring 122 and the corresponding torsion spring for the leg 40. As the cross bar 66 moves in the channel 60 and the corresponding channel for the leg 52, the mechanical advantage of the leverage of linkage member 72 with respect to the leg 54 increases. At a crossover point, the influence of the spring 122 and the corresponding spring for the leg 40 overcomes the opposing torque of the spring 128 and the corresponding spring for the leg 52. At that instant, the torque on 52 created by $F1 \geq$ torque $F2$. The riser assembly will snap into the upright position shown in FIG. 5. Conversely, when the operator moves the cross bar 66 upwardly in order to fold the riser assembly from the position shown in FIG. 5 to the position shown in FIG. 4, the mechanical advantage of the leverage between linkage member 72 and the leg 54 and between the linkage member 74 and the leg 52 will decrease as the ends of the cross bar 66 are guided by the rollers in the channel 70 and in the channel in the leg 52. At the crossover point where the influence of the spring 128 and the opposing influence of the spring 122, together with the corresponding springs for the legs 52 and 40, is overcome, the riser assembly will snap into the lowered position shown in FIG. 4. At that instant, torque on leg 52 created by $F1 \geq F2$.

Although we have described a preferred embodiment of the invention, it is anticipated that persons skilled in this art may make modifications to the design without departing from the teachings of the invention. The appended claims are not intended to define only the specific embodiment described in the specification. All such modifications of the design, as well the equivalents thereof, are within the scope of the following claims.

We claim:

1. A foldable seat assembly for a rear passenger in a multiple-passenger vehicle having at least one forward seat assembly, the vehicle having a floor structure rearward of the forward seat assembly;

said foldable seat assembly comprising a passenger supporting seat portion and an upright seat back portion;

a seat frame supporting said seat portion, said upright seat back portion being pivoted on said frame whereby it may be folded forward over said seat portion;

a foldable riser assembly secured to said seat frame, said riser assembly having forward and rearward legs, said legs being pivotally connected to said frame at the upper ends of said legs;

first linkage members connecting the lower end of each of said rearward legs to the forward legs at locations intermediate the ends of the forward legs;

second linkage members at one end thereof connecting the upper ends of said rearward legs to said forward legs; and the connections between the other ends of said second linkage members and said forward legs being adjustable connections;

said adjustable connections comprising means for slidably connecting said other ends of said second linkage members to said forward legs whereby the distance between the upper ends of said forward legs and said other ends of said second linkage members can be varied.

2. The foldable seat assembly as set forth in claim 1 including a first spring assembly acting between said seat frame and one of said second linkage members to normally urge said second linkage members to a position corresponding to an upright position of said riser assembly and a second spring assembly acting between said frame and one of said forward legs to normally urge said forward legs to a position corresponding to a folded position of said riser assembly.

3. A removable and foldable seat assembly for a rear passenger in a multiple-passenger vehicle, said vehicle having a floor structure;

said seat assembly comprising a lower seat portion and an upright seat back portion;

a seat frame supporting said lower seat portion, said upright seat back portion being pivoted on said frame whereby it may be folded forward over said lower seat portion;

a foldable riser assembly secured to said seat frame, said riser assembly having forward and rearward legs, said legs being pivotally connected to said frame at the upper ends of said legs;

a first linkage member connecting the lower end of one of said forward and rearward legs to the other leg at a location intermediate the ends of the other leg;

a second linkage member at one end thereof being connected to the upper end of said one of said forward and rearward legs;

an adjustable connection between the other end of said second linkage member and said other leg;

said adjustable connection comprising means for slidably connecting said other end of said second linkage member to said other leg whereby the distance between said upper end of said other leg and said other end of said second linkage member can be varied;

a first spring assembly acting between said seat frame and said second linkage member to normally urge said second linkage member to a position corresponding to an upright position of said riser assembly and a second spring assembly acting between said frame and said other leg to normally urge said other leg to a position corresponding to a folded position of said riser assembly; and a seat base secured to said floor structure, said base having transversely extending forward and rearward seat retainer channels;

said removable seat assembly having a seat portion for supporting a passenger, a seat frame and a riser assembly secured to the seat frame, said riser assembly including forward and rearward cross bars;

said forward and rearward cross bars being receivable respectively in said forward and rearward seat retainer channels whereby said removable seat assembly is secured in place on said seat base.

4. The removable and foldable seat assembly set forth in claim 3 wherein said seat base comprises locking bars extending in a generally fore-and-aft direction through said retainer channels;

said locking bars extending over said cross bars when said cross bars are received in said channels thereby locking said riser assembly in place.

5. The removable and foldable seat assembly set forth in claim 4 wherein said seat base includes a manually actuable lever pivoted thereon, said lever being attached to said locking bars whereby said locking bars are moved between riser assembly locking and riser assembly release positions upon movement of said lever.

* * * * *